(12) United States Patent
Inada

(10) Patent No.: US 8,997,014 B2
(45) Date of Patent: Mar. 31, 2015

(54) AGGREGATING RSS TICKER FOR DISPLAY DEVICES

(75) Inventor: Hajime Inada, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 464 days.

(21) Appl. No.: 12/570,208

(22) Filed: Sep. 30, 2009

(65) Prior Publication Data

US 2010/0083126 A1 Apr. 1, 2010

(30) Foreign Application Priority Data

Sep. 30, 2008 (JP) ................................. 2008-252874

(51) Int. Cl.
  G06F 3/00 (2006.01)
  G06F 3/048 (2013.01)
  G06F 15/16 (2006.01)
  G06F 17/30 (2006.01)
  G06F 3/0482 (2013.01)
  G06F 3/0485 (2013.01)
  (Continued)

(52) U.S. Cl.
  CPC ........ *G06F 17/30064* (2013.01); *G06F 3/0482* (2013.01); *G06F 3/0485* (2013.01); *G06F 3/0481* (2013.01); *H04L 29/0809* (2013.01)
  USPC ........... 715/774; 715/739; 715/786; 709/203; 709/219

(58) Field of Classification Search
  CPC ... G06F 3/0481; G06F 3/0482; G06F 3/0485; G06F 17/30064; H04L 29/0809
  USPC ................... 709/203, 219; 715/739, 774, 786
  See application file for complete search history.

(56) References Cited

U.S. PATENT DOCUMENTS 6,247,012 B1 * 6/2001 Kitamura et al. ...................... 1/1
6,836,768 B1 * 12/2004 Hirsch .......................... 715/225

(Continued)

FOREIGN PATENT DOCUMENTS

JP 2005-228102 A 8/2005
JP 2006-215741 A 8/2006

(Continued)

OTHER PUBLICATIONS

Japan Patent Office; Notice of Reasons for Rejection for Application No. JP2008-252874, mailed Sep. 28, 2010.

(Continued)

*Primary Examiner* — Eric J Bycer
(74) *Attorney, Agent, or Firm* — Baker Botts L.L.P.

(57) ABSTRACT

A communication apparatus comprises a data receiving unit, a display, a selection receiving unit and a controller. The controller is configured to acquire the content summary information via the data receiving unit and to control the display to display a plurality of titles included in the acquired content summary information with scrolling in a single line. The controller is further configured to accept a first selection and to determine a first selected title which is displayed when the first selection is inputted. The controller is still further configured to control the display to display a list of a plurality of titles of content summary information acquired from the external server. Moreover, the controller is configured to accept a second selection received via the selection receiving unit and determine a second selected title among the plurality of titles displayed in the list. The controller is further configured to acquire a content corresponding to the second selected title via the data receiving unit.

6 Claims, 13 Drawing Sheets

(51) Int. Cl.
  *G06F 3/0481* (2013.01)
  *H04L 29/08* (2006.01)

(56) References Cited

U.S. PATENT DOCUMENTS

| | | | |
|---|---|---|---|
| 2004/0003097 A1* | 1/2004 | Willis et al. | 709/228 |
| 2005/0185825 A1 | 8/2005 | Hoshino et al. | |
| 2006/0213976 A1* | 9/2006 | Inakoshi et al. | 235/380 |
| 2007/0078857 A1* | 4/2007 | Punaganti et al. | 707/10 |
| 2007/0083468 A1* | 4/2007 | Wetherell | 705/51 |
| 2007/0174298 A1 | 7/2007 | Tanimoto | |
| 2007/0214477 A1* | 9/2007 | Read | 725/38 |
| 2008/0065737 A1* | 3/2008 | Burke et al. | 709/217 |
| 2008/0082941 A1* | 4/2008 | Goldberg et al. | 715/810 |
| 2008/0165209 A1 | 7/2008 | Kondo et al. | |
| 2009/0013071 A1 | 1/2009 | Matoba et al. | |
| 2009/0083373 A1 | 3/2009 | Matoba et al. | |
| 2010/0036855 A1 | 2/2010 | Sasaki et al. | |
| 2010/0082797 A1 | 4/2010 | Nakamura | |

FOREIGN PATENT DOCUMENTS

| | | |
|---|---|---|
| JP | 2007-179320 A | 7/2007 |
| JP | 2007-199998 A | 8/2007 |
| JP | 2007-299272 A | 11/2007 |
| JP | 2008-099030 A | 4/2008 |
| JP | 2008-102567 A | 5/2008 |
| JP | 2008-165692 A | 7/2008 |
| JP | 2008-210042 A | 9/2008 |
| JP | 2009-015713 A | 1/2009 |
| JP | 2009-075967 A | 4/2009 |
| JP | 2010-081017 A | 4/2010 |

OTHER PUBLICATIONS

The State Intellectual Property Office of the People's Republic of China, Notification of First Office Action for Chinese Patent Application No. 200910204038.X, issued Jan. 31, 2011.

The State Intellectual Property Office of the People's Republic of China, Notification of the Third Office Action for Chinese Patent Application No. 200910204038.X, issued Mar. 26, 2012.

Patent Office of the People's Republic of China, Decision on Rejection for Chinese Patent Application No. 200910204038.X, issued Dec. 31, 2012.

The State Intellectual Property Office of the People'S Republic of China, Notification of Reexamination for Chinese Patent Application No. 200910204038.X (foreign counterpart to above-captioned patent application), mailed Oct. 31, 2014.

* cited by examiner

AGGREGATING RSS TICKER FOR DISPLAY DEVICES

CROSS REFERENCE TO RELATED APPLICATION

This application claims priority to and the benefit of Japanese Patent Application No. 2008-252874, filed Sep. 30, 2008, the entire subject matter and disclosure of which is incorporated herein by reference.

BACKGROUND

1. Technical Field

The present invention relates to a communication apparatus for displaying a title of a content which is opened to the public on a network.

2. Description of the Related Art

A variety of contents are opened to the public on a network. There are servers that open content summary information including the URLs (Uniform Resource Locators) and the titles of respective contents to the public. An example of the content summary information is feed information. Examples of the format of the feed information are RSS (Resource Description Framework Site Summary) and Atom.

In a known system structure, RSS feed information (each including an image of an article) is acquired from a plurality of RSS servers and titles of the articles are displayed as a list. When one of the titles is selected, the title, the description, the image of the selected article and a link button for accessing the Web page of the article are displayed. When the link button is selected, the information of the Web page is acquired to be displayed.

When titles of articles are displayed as a list in a comparatively small display apparatus, the entire list of the titles cannot be displayed but merely a part of the list is displayed in the display apparatus. This is disadvantageous because it takes time and effort to find desired article information by, for example, scrolling the list of the titles.

SUMMARY

A need has arisen to provide a communication apparatus which may enable a user to readily find and access desired article information. According an embodiment of the present invention, a communication apparatus comprises a data receiving unit configured to receive content summary information from an external server, a display configured to display information and a selection receiving unit configured to receive a selection inputted by a user. The communication apparatus comprises a controller. The controller is configured to acquire the content summary information via the data receiving unit and to control the display to display a plurality of titles, which are included in the acquired content summary information, in a predetermined order with scrolling within a single line. The controller is further configured to accept a first selection received via the selection receiving unit and to determine a first selected title which is displayed when the first selection is inputted by the user. The controller is still further configured to control the display to display a list of a plurality of titles of content summary information acquired from the external server which is a source of the content summary information of the determined first selected title. Moreover, the controller is configured to accept a second selection received via the selection receiving unit and determine a second selected title among the plurality of titles displayed in the list. The controller is further configured to acquire a content corresponding to the second selected title via the data receiving unit.

According an embodiment of the present invention, a control method for a communication apparatus comprising a data receiving unit, a display and a selection receiving unit, comprises a step of acquiring content summary information via the data receiving unit. The method further comprises a step of controlling the display to display a plurality of titles, which are included in the acquired content summary information, in a predetermined order with scrolling in a single line. The method still further comprises a step of accepting a first selection received via the selection receiving unit and a step of determining a first selected title which is displayed when the first selection is inputted by the user. Moreover, the method comprises a step of controlling the display to display a list of a plurality of titles of content summary information acquired from the external server which is a source of the content summary information of the determined first selected title. The method further comprises a step of accepting a second selection received via the selection receiving unit and a step of determining a second selected title among the plurality of titles displayed in the list when the second selection is inputted by a user. The method still further comprises a step of acquiring a content corresponding to the second selected title via the data receiving unit.

BRIEF DESCRIPTION OF THE DRAWINGS

For a more complete understanding of the present invention, the needs satisfied thereby, and the features and advantages thereof, reference now is made to the following descriptions taken in connection with the accompanying drawings.

DESCRIPTION OF THE PREFERRED EMBODIMENTS

Embodiments of the present invention and their features and advantages may be understood by referring to FIGS. 1-13, like numerals being used for like corresponding parts in the various drawings.

Figure 1:
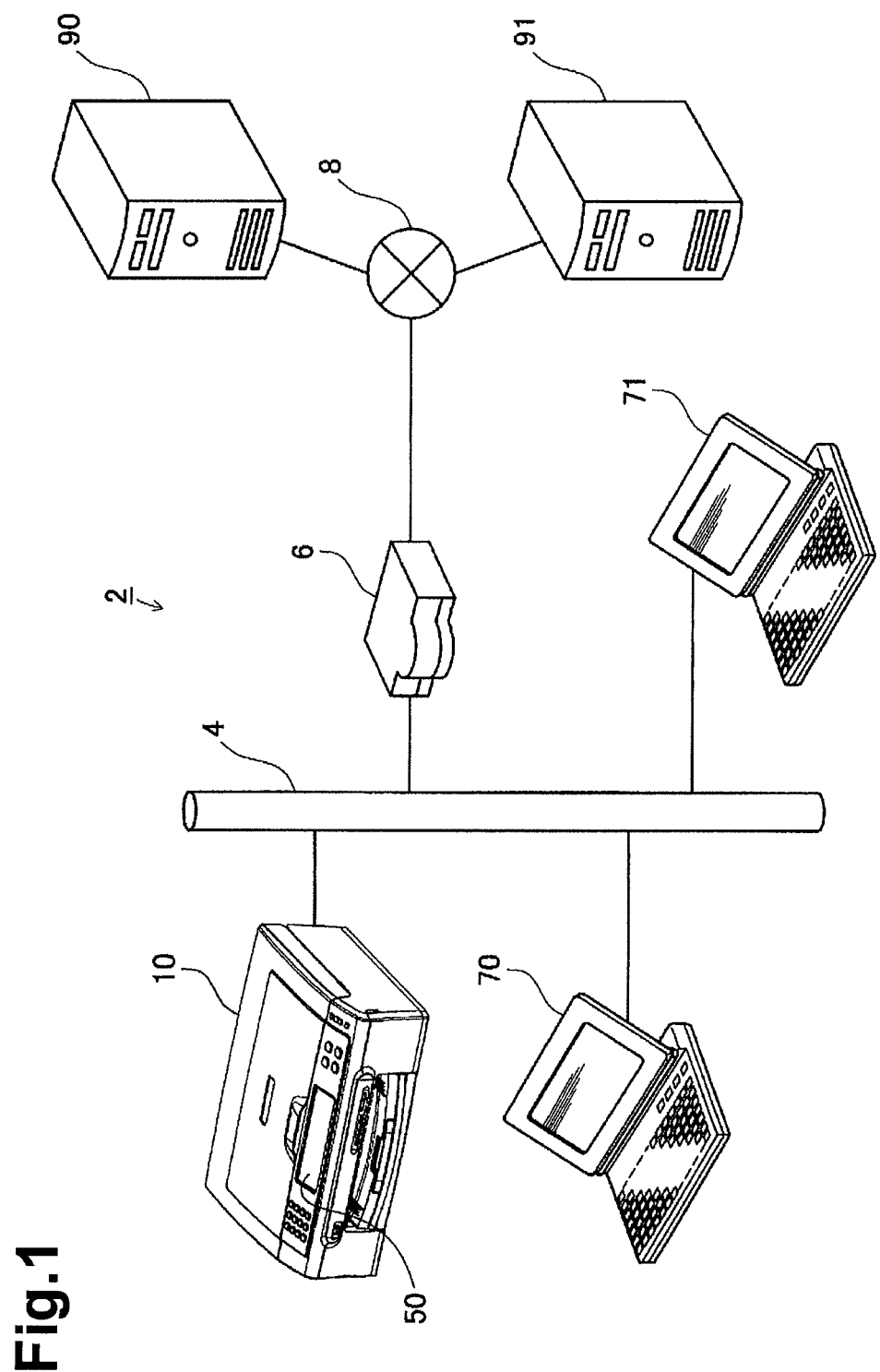
FIG. 1 is a diagram illustrating the architecture of a multifunctional machine system.

A preferred embodiment of the invention will now be described with reference to the accompanying drawings. FIG. 1 is a schematic diagram illustrating a multifunctional machine system 2 according to this embodiment. The multifunctional machine system 2 includes a multifunctional machine 10, a plurality of PCs 70 and 71 and a plurality of content distribution servers 90 and 91. The multifunctional machine 10 is connected to a LAN 4. Each of the PCs 70 and 71 is connected to the LAN 4. The LAN 4 is connected to the Internet 8 through a router 6. Each of the content distribution servers 90 and 91 is connected to the Internet 8. In this embodiment, the content distribution server 90 opens one website to the public and the content distribution server 91 opens another website to the public. Each website includes a plurality of contents. Furthermore, each content distribution server 90 or 91 stores feed information (in the RSS format) corresponding to summary information of the plural contents included in its website. Details of the information will be described in detail later.

(Configuration of Multifunctional Machine)

Figure 2:
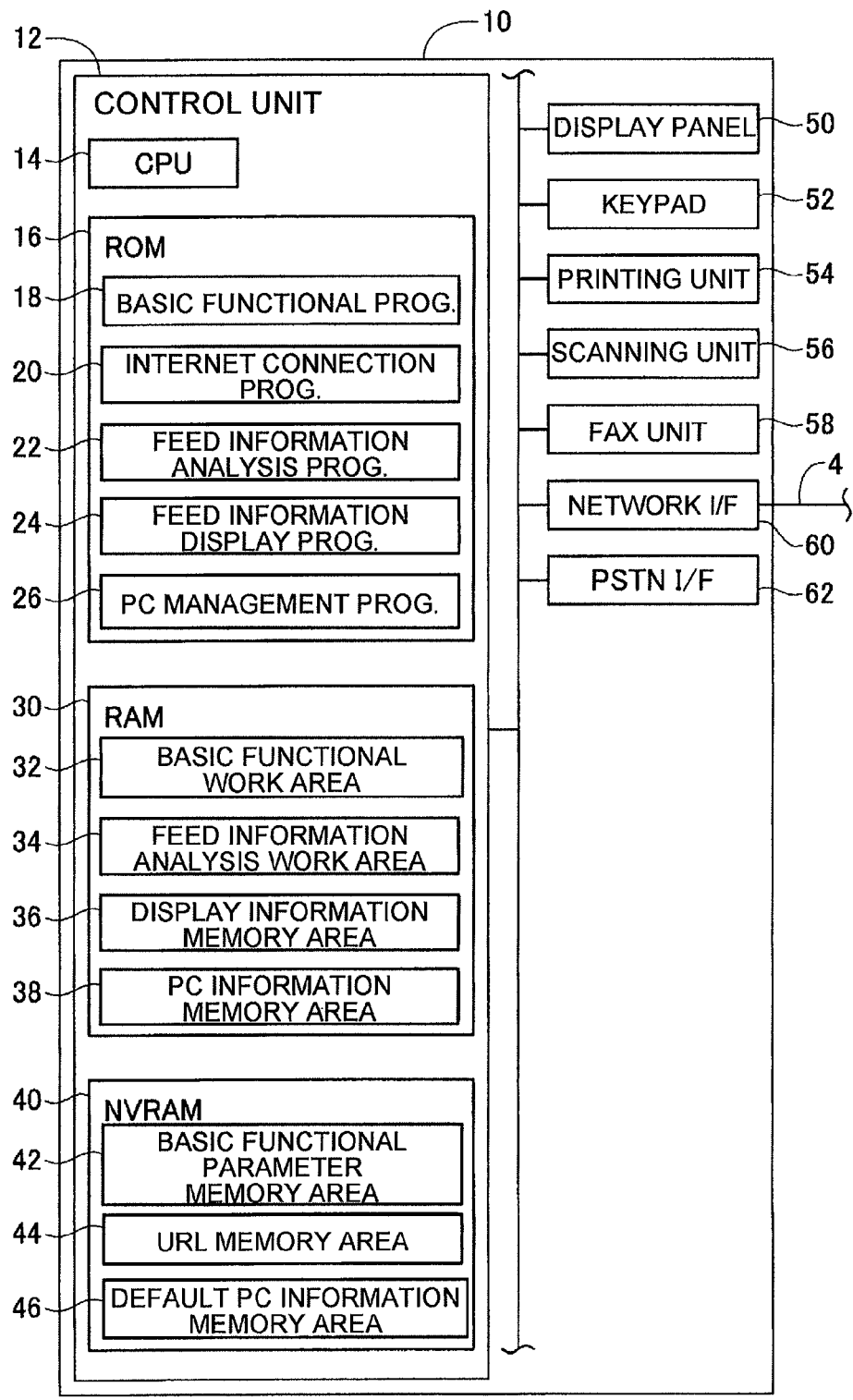
FIG. 2 is a diagram illustrating the configuration of a multifunctional machine.

FIG. 2 illustrates the configuration of the multifunctional machine 10. The multifunctional machine 10 includes a control unit 12, a display panel 50, a keypad 52, a printing unit 54, a scanning unit 56, a fax unit 58, a network interface 60, a PSTN interface 62 and the like. The control unit 12 includes a CPU 14, a ROM 16, a RAM 30, an NVRAM 40 and the like.

The CPU 14 executes various processes in accordance with programs 18 through 26 stored in the ROM 16. The processes executed by the CPU 14 will be described in detail later. The ROM 16 stores the various programs 18 through 26. The basic functional program 18 is a program for controlling the basic operation of the multifunctional machine 10. The basic functional program 18 includes, for example, a program for creating display data to be displayed on the display panel 50. Also, the basic functional program 18 includes, for example, a program for controlling the printing unit 54, the scanning unit 56, the fax unit 58 or the like. The internet connection program 20 is a program for attaining connection to the Internet 8. The feed information is acquired from the content distribution servers 90 and 91 by the internet connection program 20. The feed information analysis program 22 is a program for analyzing feed information acquired from the content distribution server 90 or 91 and creating information to be displayed on the display panel 50 (hereinafter designated as display information). The feed information display program 24 is a program for displaying display information. The PC management program 26 is a program for executing a process in accordance with PC activation notification transmitted from the PC 70 or 71.

The RAM 30 includes a variety of memory areas 32 through 38. The basic functional work area 32 is a memory area for storing various data created in executing the process in accordance with the basic functional program 18. The feed information analysis work area 34 is a memory area for storing various data created in executing the process in accordance with the feed information analysis program 22. The display information memory area 36 is a memory area for storing display information created in accordance with the feed information analysis program 22. The PC information memory area 38 is a memory area for storing information on a PC corresponding to a sender of the PC activation notification.

The NVRAM 40 includes a variety of memory areas 42 through 46. The basic functional parameter memory area 42 is a memory area for storing various parameters (such as print setting or scan setting) to be used when the CPU 14 executes the process in accordance with the basic functional program 18. The URL memory area 44 is a memory area for storing the URLs of the feed information of the respective content distribution servers 90 and 91. For example, a user should be registered for receiving a content distribution service from each content distribution server 90 or 91. This registration may be executed by using the multifunctional machine 10 or by using the PC 70 or 71.

The display panel 50 can display a variety of information. The display panel 50 has a display screen smaller than that of the PCs 70 and 71. For example, the PCs 70 and 71 are equipped with an LCD of 17 inches or more while the size of the display screen of the display panel 50 is 6 inches or less. The display panel 50 functions as a touch panel. The keypad 52 includes a plurality of keys. A user can input various instructions and information to the multifunctional machine 10 by operating the keypad 52. The network interface 60 is connected to the LAN 4. The multifunctional machine 10 can communicate with the PCs 70 and 71 as well as get access to the Internet 8. The PSTN interface 62 is connected to a PSTN (Public Switched Telephone Network) not shown. The PSTN may be used in fax communication or telephone communication.

(Memory Contents of URL Memory Area)

Figure 3:
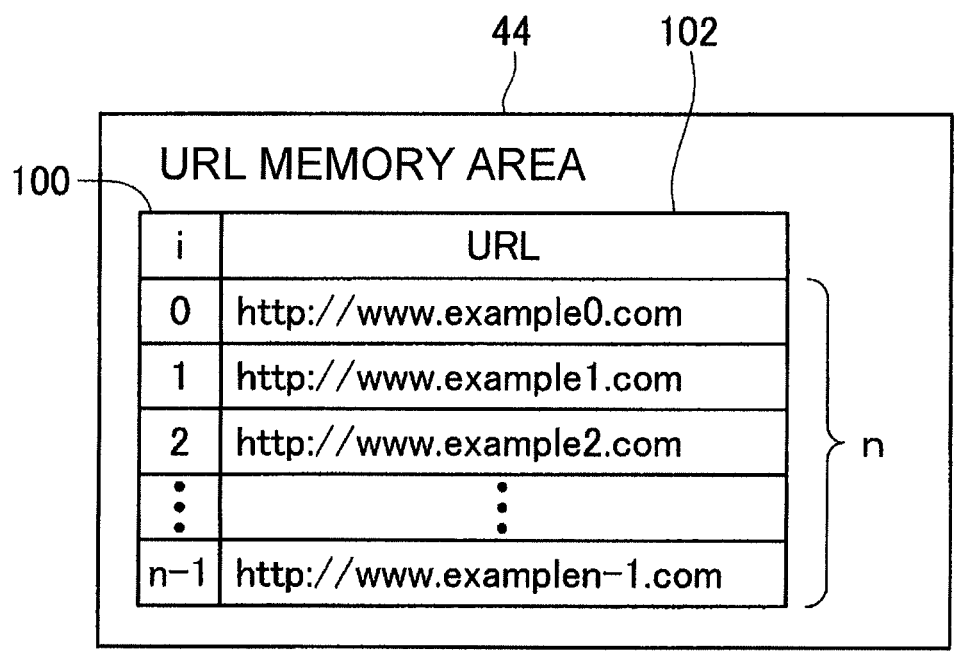
FIG. 3 is a diagram illustrating exemplary memory contents of a URL memory area.

Next, memory contents of the URL memory area 44 (see FIG. 2) of the NVRAM 40 will be described. FIG. 3 illustrates exemplary memory contents of the URL memory area 44. The URL memory area 44 can store the URLs 102 of the feed information of each content distribution server 90 or 91. In other words, the URL memory area 44 can store the URLs 102 of the feed information of respective websites. In the exemplary case illustrated in FIG. 3, n URLs 102 are stored. At this point, "n" is defined as the number of registered websites. Each URL 102 is provided with an identification number 100. In this embodiment, the identification number 100 is indicated by "i".

(Memory Contents of Display Information Memory Area)

Figure 4:
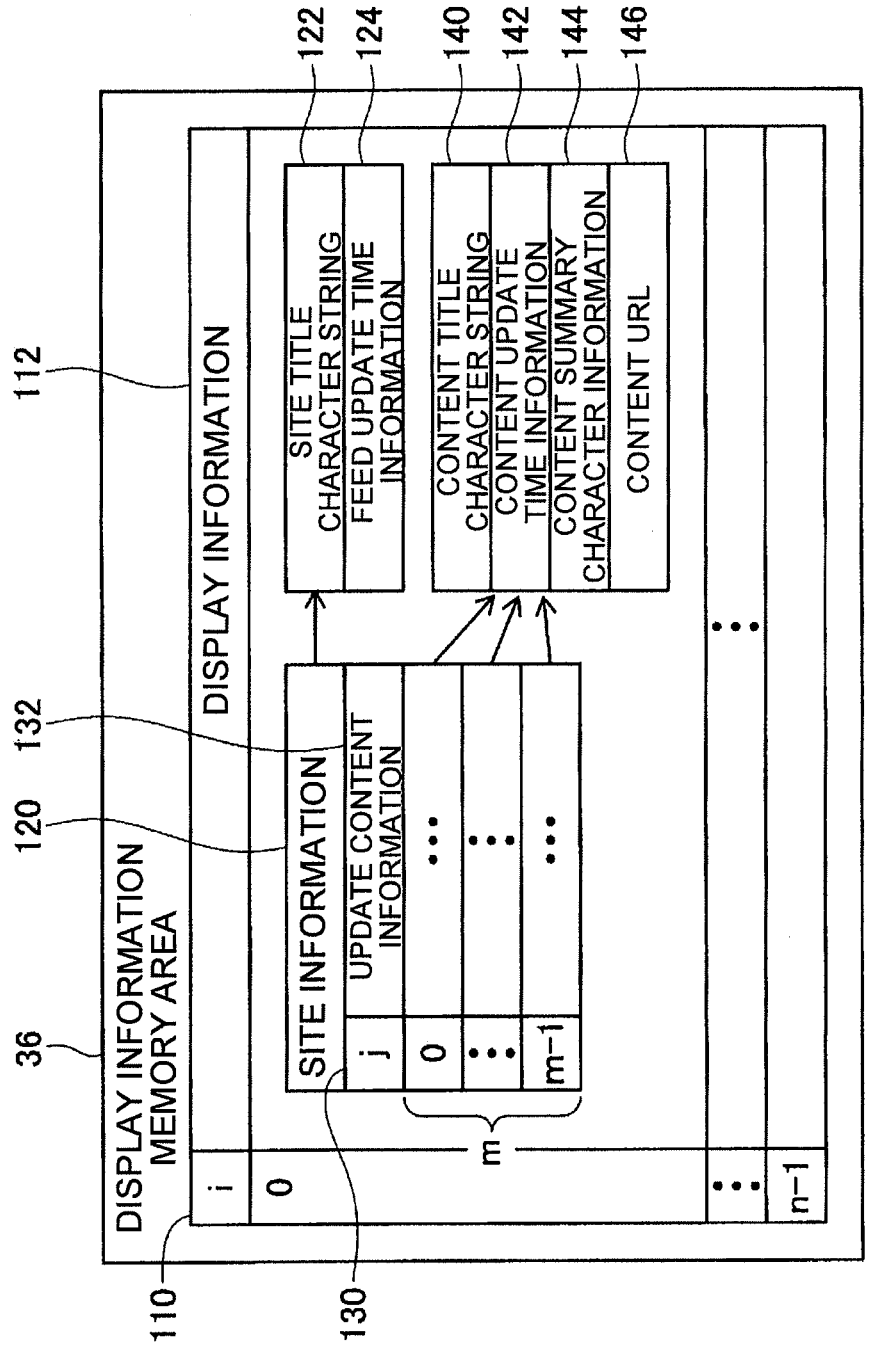
FIG. 4 is a diagram illustrating exemplary memory contents of a display information memory area.

Subsequently, memory contents of the display information memory area 36 (see FIG. 2) of the RAM 30 will be described. FIG. 4 illustrates exemplary memory contents of the display information memory area 36. The display information memory area 36 can store display information 112 correspondingly to each URL stored in the URL memory area 44. In other words, the display information memory area 36 can store the display information 112 correspondingly to each website stored in the URL memory area 44. As described above, the URL memory area 44 stores n (wherein n is an integer not less than 1) URLs 102 (see FIG. 3). Therefore, the display information memory area 36 also stores n display information 112. Each display information 112 is provided with an identification number 110. In this embodiment, the identification number 110 is indicated by "i".

The data structure of each display information 112 will be described. Each display information 112 includes website information 120. The website information 120 includes a website title character string 122 and feed update time information 124. The website title character string 122 is a character string corresponding to the title of the website. The title of the website may also be designated as the "name of the website". The feed update time information 124 is information on date and time (the latest update date and time) when the feed information was updated in the content distribution server.

Each display information 112 also includes update content information 132. The number of update content information 132 is equal to the number of contents included in the website. For example, in the exemplary case of FIG. 4, display information 112 corresponding to the identification number "i" of "0" includes m (wherein m is an integer not less than 1) update content information 132. At this point, "m" is defined as the number of registered contents. This means that the website corresponding to the identification number "i" or "0" includes m contents. For example, when a given website includes a content on weather forecast and a content on sports, display information 112 corresponding to this website includes two update content information 132. Each update content information 132 is provided with an identification number 130. In this embodiment, the identification number 130 is indicated by "j".

Furthermore, the identification number 130 allocated to each of the m update content information 132 represents the priority. It is assumed, in this embodiment, that update content information 132 allocated to, for example, an identification number 130 of "0" has the highest priority and that update content information 132 allocated to an identification number 130 of "m-1" has the lowest priority. Alternatively, the priority can be determined by using various parameters. It is assumed, in this embodiment, that later update content information 132 has a higher priority. Specifically, it is assumed that a smaller identification number 130 is allocated to update content information 132 including later content update time information 142.

Each update content information 132 includes a content title character string 140, content update time information 142, a content summary character string 144 and a content URL 146. The content title character string 140 is a character string corresponding to the title of the content. The title of the content may be also designated as the "name of the content". The content update time information 142 is information on date and time (the latest update date and time) when the content was updated in the content distribution server. The content summary character string 144 is a summary of character strings included in the content. In other words, the content summary character string 144 is a character string that includes a larger number of characters than the title of the content and a smaller number of characters than the whole content and reflects the details of the content. The content URL 146 is the URL of the content.

(Feed Information Analysis Process)

Figure 5:
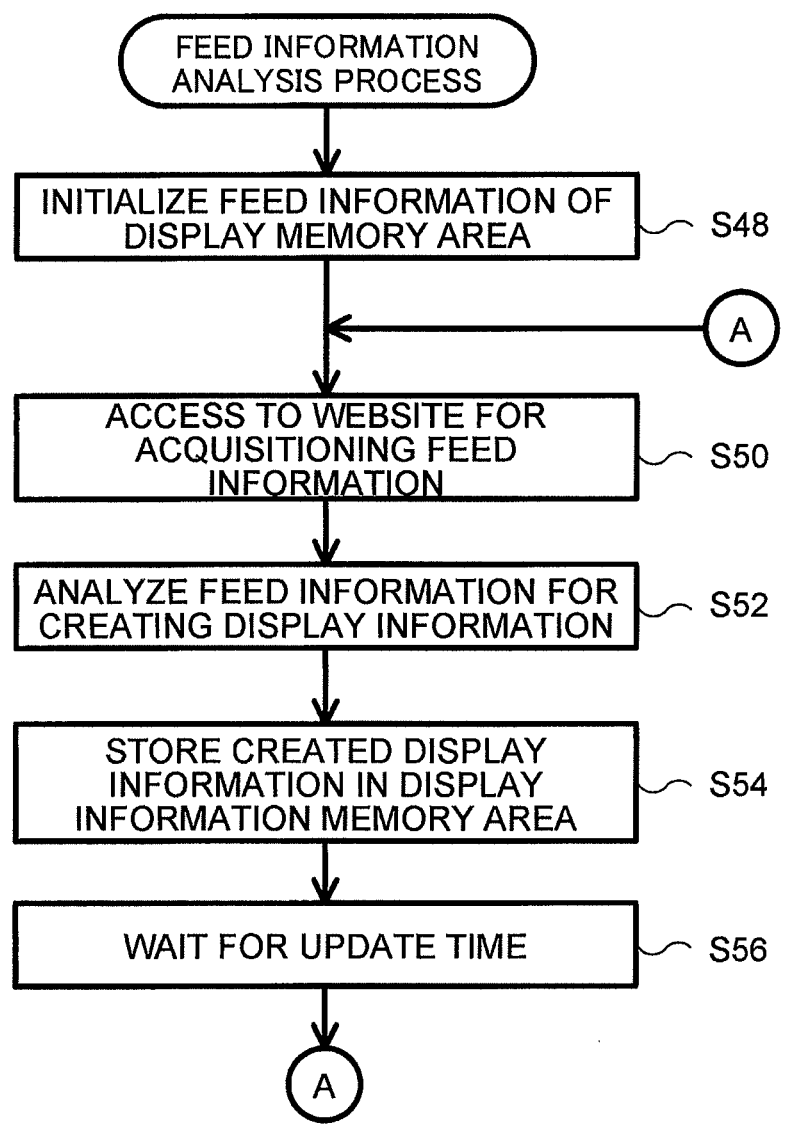
FIG. 5 is a flowchart of a feed information analysis process executed by the multifunctional machine.

Next, a feed information analysis process in which the CPU 14 of the multifunctional machine 10 acquires and analyzes feed information will be described. The feed information analysis process is operated as an independent task and is executed from the activation of the multifunctional machine 10 in accordance with the internet connection program 20 and the feed information analysis program 22 (see FIG. 2). FIG. 5 is a flowchart of the feed information analysis process.

In S48, the display information 112 stored in the display information memory area 36 is initialized. Then, the process proceeds to S50.

In S50, the CPU 14 makes accesses successively to n websites for acquiring feed information from each website. The feed information includes the website information 120 and the update content information 132 illustrated in FIG. 4.

In S52, the CPU 14 analyzes the feed information so as to create the display information 112 illustrated in FIG. 4. In S54, the CPU 14 stores the created display information 112 in the display information memory area 36. In S56, the CPU 14 waits until update time. The update time may be, for example, set by a user or determined in accordance with a program. When the update time has come, the process returns to S50. Through the execution of the procedures of S48 through S56 of FIG. 5 in this manner, the latest feed information of each of the n websites is stored in the display information memory area 36.

(Display Process)

Figure 6:
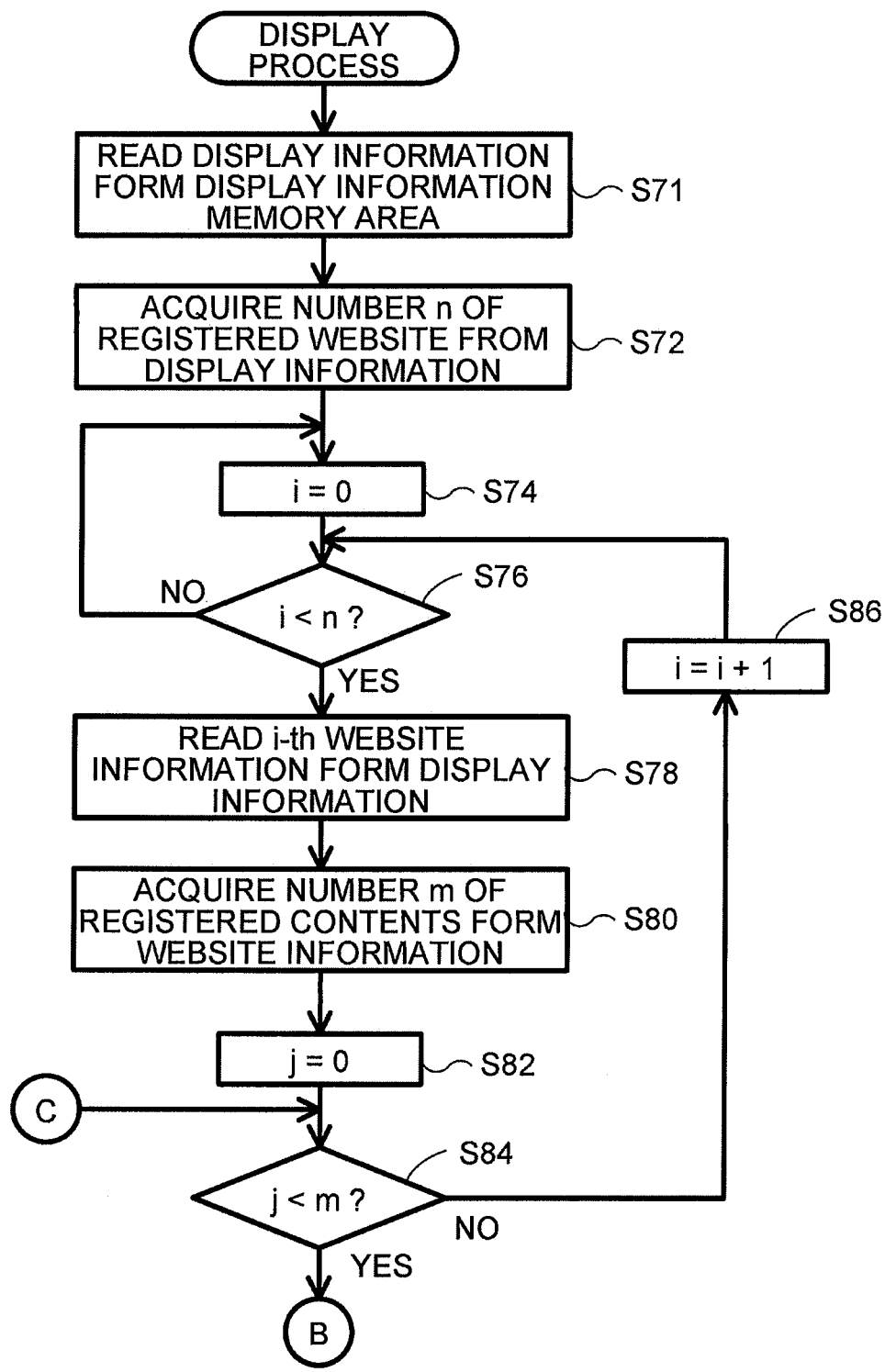
FIG. 6 is a flowchart (of a first part) of a display process executed by the multifunctional machine.

Next, a display process in which the CPU 14 of the multifunctional machine 10 displays the feed information will be described with reference to the flowcharts of FIGS. 6 and 7. The display process is operated as an independent task and is executed from the activation of the multifunctional machine 10 in accordance with the feed information display program 24 (see FIG. 2). In S71 of FIG. 6, the CPU 14 reads the display information 112 from the display information memory area 36. In S72, the CPU 14 acquires the number n of registered websites stored in the URL memory area 44 (see FIG. 2) of the NVRAM 40. In S74, the CPU 14 initializes a counter i. In S76, the CPU 14 determines whether or not the count of the counter i is smaller than the number n of registered websites. When the count of the counter i is not smaller than the number n of registered websites (NO in S76), the process returns to S74. On the other hand, when the count of the counter i is smaller than the number n of registered websites (YES in S76), the process proceeds to S78.

In S78, the CPU 14 acquires the website information included in the display information of the i-th website from the display information memory area 36 of the RAM 30. In acquisition of the website information of, for example, the 0th website, the website information 120 (including the website title character string 122 and the feed update time information 124) is acquired in the exemplary case of FIG. 4. Subsequently, in S80, the CPU 14 acquires the number m of registered contents of the i-th website. In S82, the CPU 14 initializes a counter j. In S84, the CPU 14 determines whether or not the count of the counter j is smaller than the number m of registered contents. When the count of the counter j is not smaller than the number m of registered contents (NO in S84), the process proceeds to S86, where the count of the counter i is incremented by 1, and the process returns to S76. On the other hand, when the count of the counter j is smaller than the number m of registered contents (YES in S84), the process proceeds to S88.

Figure 7:
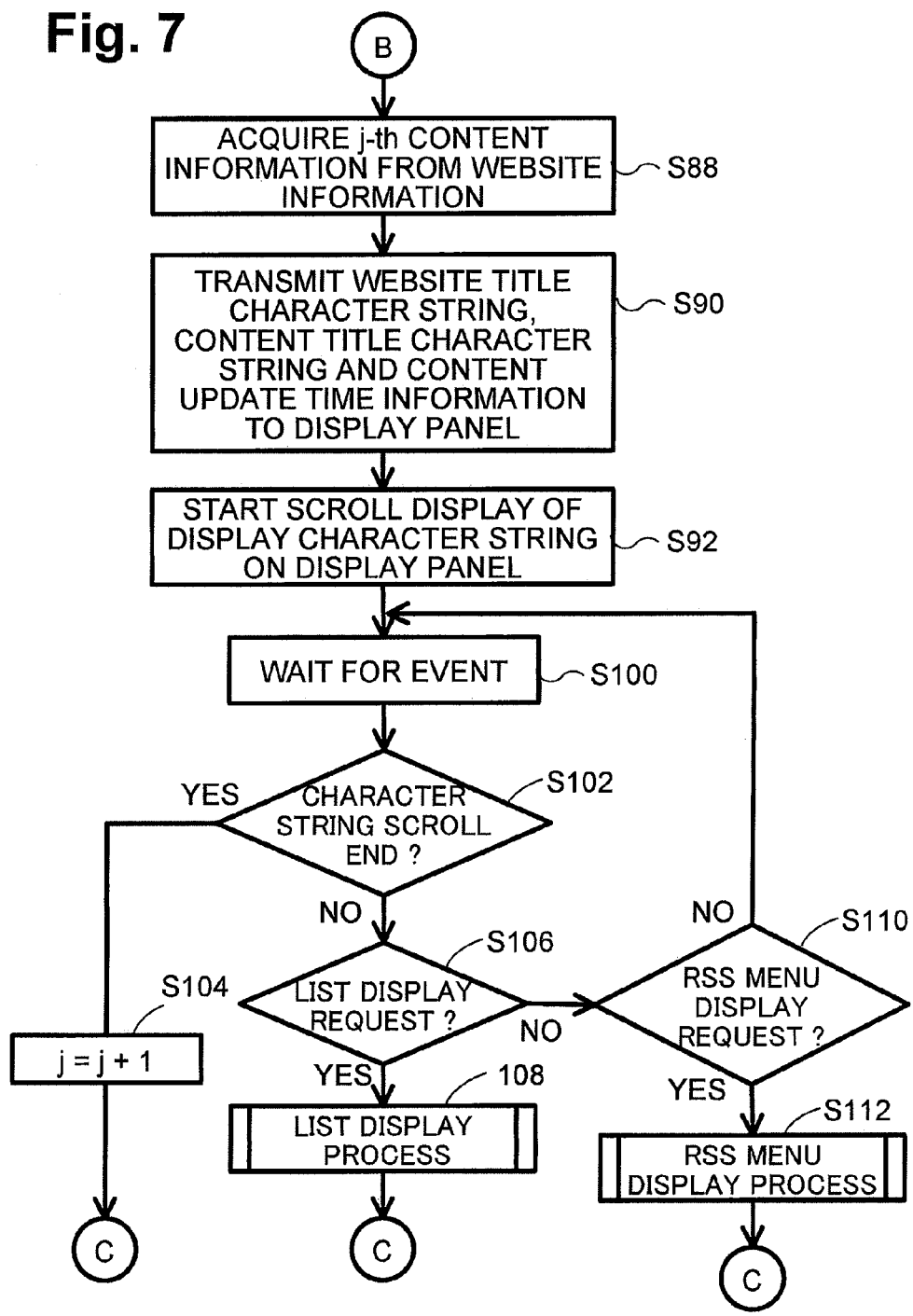
FIG. 7 is a flowchart (of a second part) of the display process executed by the multifunctional machine.

In S88 of FIG. 7, the CPU 14 acquires the j-th update content information of the i-th website from the display information memory area 36 of the RAM 30. Thus, the content title character string 140, the content update time information 142, the content summary character string 144 and the content URL 146 of one content are acquired. Subsequently, in S90, the CPU 14 transmits, to the display panel 50, the website title character string 122 acquired in S78, the content title character string 140 acquired in S88 and the content update time information 142 acquired in S88.

In S92, a display character string is displayed in the form of one-line scroll display on the display panel 50. In the one-line scroll display, a content title character string 162 is displayed, in a telop-like manner, by moving characters of the title across the display panel 50 from the right to the left as illustrated in an upper section of FIG. 12. Thus, even though the display panel 50 is small, the whole of the content title character string 162 can be displayed. Incidentally, the website title character string 122 or the content update time information 142 may be displayed on the display panel 50. After the procedure of S92, the process proceeds to S100.

In S100, the CPU 14 waits for occurrence of an event. Examples of the event to be waited for in S100 are a character string scroll end event and a list display request event. When the event occurs, the process proceeds to S102.

In S102, the CPU 14 determines whether or not the character string scroll end event has occurred. The character string scroll end event is an event for informing that the scroll display of the content title character string 162 of one content has ended. When the character string scroll end event has occurred (YES in S102), the process proceeds to S104. In S104, the CPU 14 increments the count of the counter j by 1, and the process proceeds to S84 of FIG. 6. In this S84, when it is determined that the count of the counter j is smaller than the number m, the CPU 14 executes the procedures of S88, S90 and S92 again. Thus, the content title character string 162 of the next update content information (for example, the 1st update content information) is displayed in the telop-like manner. When the content title character strings 162 of all the update content information of one website have been displayed in the telop-like manner, it is determined as NO in S84. In this case, the CPU 14 increments the count of the counter i by 1 (S86) and executes the procedures of S78 through S92 with respect to a next website (for example, the 1st website). In this manner, the content title character strings 162 of the update content information of the next website are displayed in the telop-like manner.

On the other hand, when it is determined in S102 that the character string scroll end event has not occurred (NO in S102), the process proceeds to S106. In S106, the CPU 14 determines whether or not a list display request event has occurred. The list display request event is an event for informing that a user has selected (or input with a key) the content title character string 162 while it is being displayed in the telop-like manner as illustrated in the upper section of FIG. 12. Thus, the user can select the update content information 132 corresponding to the content title character string 162. When the list display request event has occurred (YES in S106), the process proceeds to S108, where the CPU 14 executes a list display process. The list display process will be described in detail later. On the other hand, when the list display request event has not occurred (NO in S106), the process proceeds to S110.

In S110, the CPU 14 determines whether or not an RSS menu display request event has occurred. The RSS menu display request event is an event for informing that an operation for selecting a content distribution server has been performed. The operation for selecting a content distribution server can be performed independently of the aforementioned operation for selecting the content title character string 162.

Figure 12:
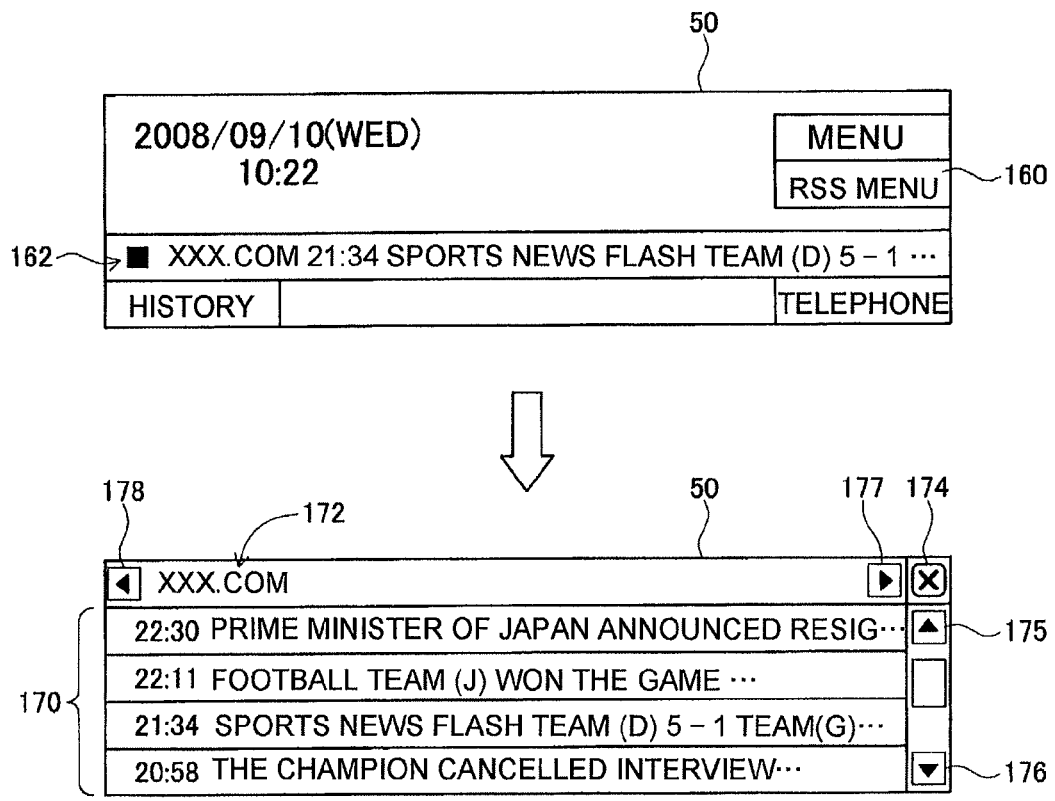
FIG. 12 is a diagram illustrating an example of details displayed on a display panel.

In this embodiment, not only the content title character string 162 but also an RSS menu button 160 is displayed on the display panel 50 as illustrated in the upper section of FIG. 12. When a user selects (or input with a key) the RSS menu button 160, the RSS menu display request event is generated.

In this manner, a user can browse a desired content not only by selecting the content title character string 162 scroll displayed but also by selecting the RSS menu button 160. In other words, a user is provided with a plurality of means for browsing a desired content. Therefore, the accessibility to a content desired by a user can be further improved.

When the RSS menu display request event has not occurred (NO in S110), the process returns to S100. On the other hand, when the RSS menu display request event has occurred (YES in S110), the process proceeds to S112, where the CPU 14 executes an RSS menu display process. The RSS menu display process will be described in detail later.

(List Display Process)

Figure 8:
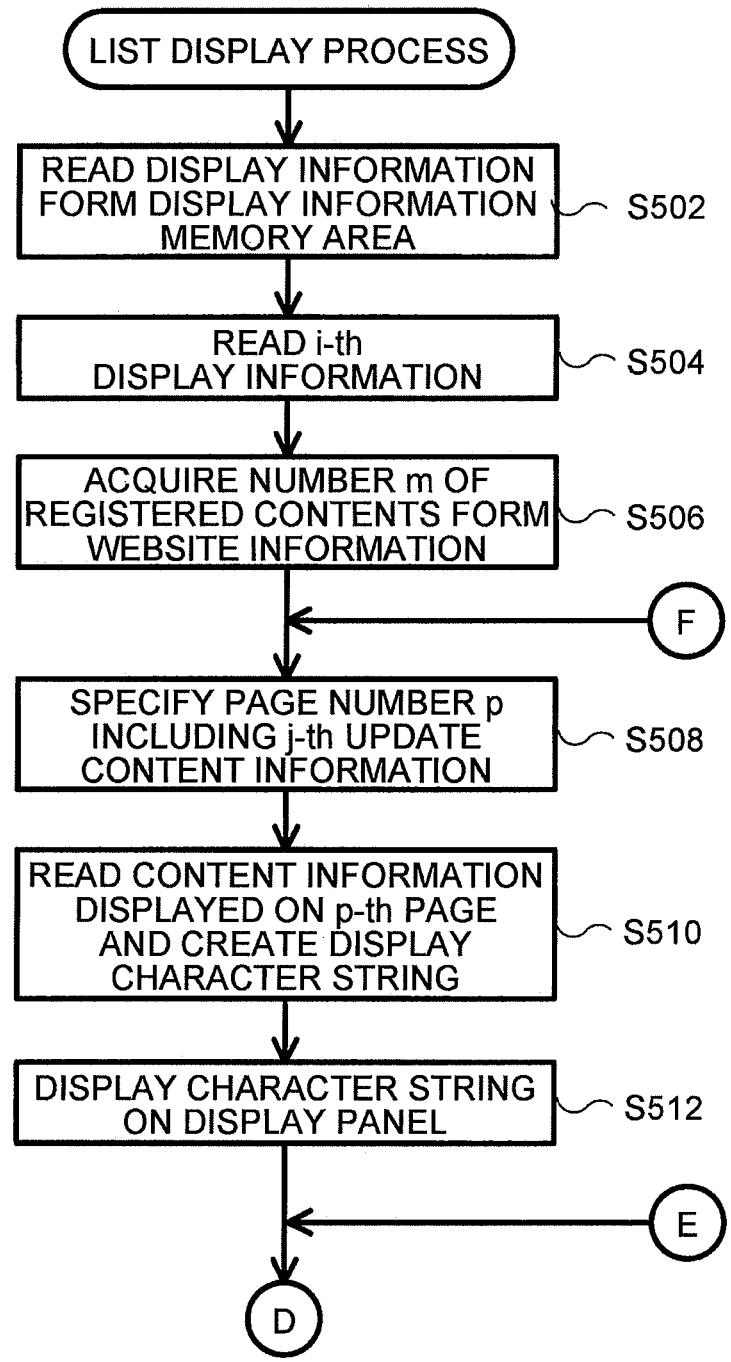
FIG. 8 is a flowchart (of a first part) of a list display process executed by the multifunctional machine.

Next, the list display process performed in S108 will be described with reference to the flowcharts of FIGS. 8 and 9. In S502, the CPU 14 reads the display information 112 from the display information memory area 36. In S504, the CPU 14 acquires the website information included in the display information of the i-th website from the display information memory area 36 of the RAM 30. In S506, the CPU 14 acquires the number m of registered contents of the i-th website.

In S508, the CPU 14 specifies, in the display information memory area 36 of the RAM 30, a page number p in which the j-th update content information 132 is included. The page number p is specified as follows: The number of rows of a list 170 to be displayed on the display panel 50 is defined as a display row number L. The list 170 includes, with respect to each of a plurality of (for example, m) contents, the content update time information 142 and the content title character string 140 of the content. In the exemplary case illustrated in a lower section of FIG. 12, four content title character strings 140 and four pieces of content update time information 142 of the update content information 132 are displayed. Therefore, the display row number L is 4. Also, in this exemplary case, a website title character string 172 of the content distribution server is displayed as "XXX.COM".

Furthermore, in the exemplary case illustrated in the lower section of FIG. 12, the number of rows of the list 170 scrolled up or down by selecting an up button 175 or a down button 176 once is defined as a scroll row number S. When the scroll row number S is 1, the list is scrolled by one row at a time.

Furthermore, as illustrated in FIG. 4, the display information memory area 36 stores m update content information 132 to which the identification numbers 130 of 0 through (m-1) are respectively allocated. The content title character strings of the update content information 132 are successively displayed in the form of the one-line scroll display on the display panel 50. The update content information 132 corresponding to the content title character string 162 displayed in the form of the one-line scroll display when the list display request event (of S106) occurs is dealt with as the j-th update content information 132 of S508.

The page number p where the j-th update content information 132 is included is obtained as a quotient in accordance with $p=((j+L-1)/L)$.

For example, while a content title character string 162 (21:34 Sports flash . . . ) of the update content information 132 corresponding to the identification number j of 3 is being displayed in the form of the one-line scroll display as illustrated in the upper section of FIG. 12, when a user selects by touching this content title character string 162 (namely, when the list display request event occurs), $p=(3+4-1)/4=1$ (with a remainder of 2). Therefore, the page number p is 1.

In S510, the CPU 14 reads content information to be displayed on the p-th page. Then, the CPU 14 creates list data (a display character string) including the website title character string 122 acquired in S504, the content title character string 140 acquired in S508 and the content update time information 142 acquired in S508.

In S512, the CPU 14 transmits the list data created in S510 to the display panel 50. As a result, as illustrated in the lower section of FIG. 12, four rows of titles of update content information 132 acquired from the content distribution server corresponding to the source of the update content information 132 corresponding to the title displayed in the form of the one-line scroll display (i.e., the server having the website name of XXX.COM) are displayed as the list 170. The title of the article displayed in the form of the one-line scroll display on the display panel 50 when the user touched the content title character string 162, namely, "21:34 Sports flash . . . " is included in the third row of the displayed list 170.

Figure 9:
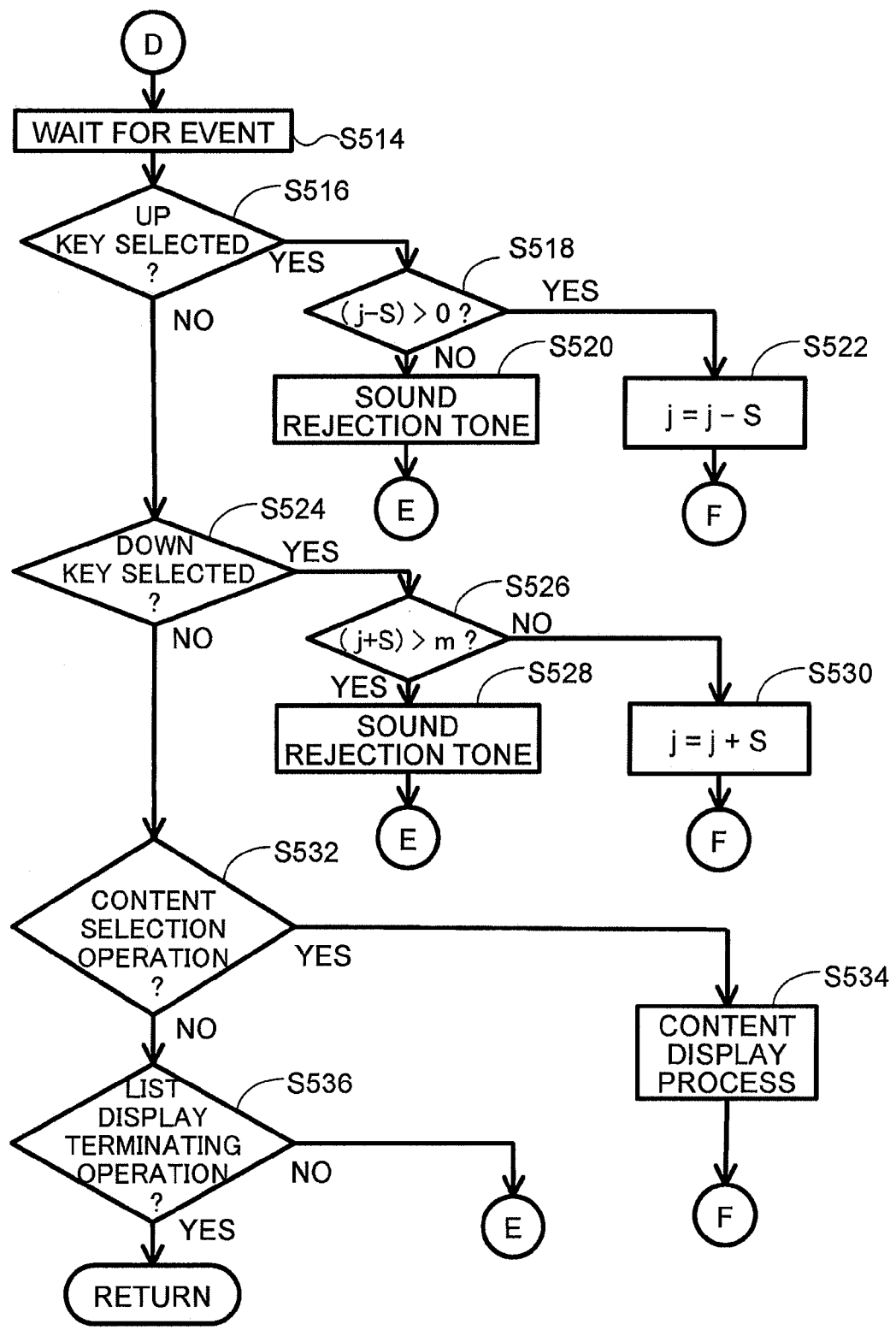
FIG. 9 is a flowchart (of a second part) of the list display process executed by the multifunctional machine.

In S514 of FIG. 9, the CPU 14 waits for occurrence of an event. As described later, the display panel 50 is controlled depending upon receipt of four kinds of events. Procedures of S516 through S530 of FIG. 9 are related to control of up or down scroll display of the list 170. On the other hand, procedures of S532 through S536 are related to control of content display.

First, the control of the scroll display of the list 170 performed in S516 through S530 will be described. In S516, the CPU 14 determines whether or not an up key selection event has received. The up key selection event is an event informing that a user has selected (or input with a key) the up button 175 when the list 170 is displayed as illustrated in the lower section of FIG. 12. Every time the up button 175 is selected, a value corresponding to the scroll row number S is subtracted from a value of the identification number 130 (i.e., the count of the counter j) of the content title character string displayed in the list. Therefore, the list 170 is scrolled up in the display panel 50 correspondingly to the scroll row number S, so as to display a content title character string with a smaller identification number 130 (a smaller count of the counter j).

When the up key selection event has received (YES in S516), the process proceeds to S518. In S518, the CPU 14 determines whether or not a value obtained by subtracting the scroll row number S from the count of the counter j is larger than 0. When the result of the subtraction is not larger than 0 (NO in S518), the update content information 132 corresponding to the count of the counter j of 0 (namely, the update content information 132 with the highest priority) has already been displayed. In other words, the list cannot be scrolled up any more in the display panel 50. Therefore, the process proceeds to S520, where the CPU 14 informs the user of this by sounding a rejection tone. Thereafter, the process returns to S514. On the other hand, when the result of the subtraction is larger than 0 (YES in S518), the process proceeds to S522. In S522, the CPU 14 sets a value obtained by subtracting the scroll row number S from the count of the counter j as a new count of the counter j. Accordingly, the list 170 is scrolled up correspondingly to the scroll row number S. Thereafter, the process returns to S508.

Alternatively, when it is determined in S516 that the up key selection event has not been received (NO in S516), the process proceeds to S524. In S524, the CPU 14 determines whether or not a down key selection event has received. The down key selection event is an event for informing that a user has selected (or input with a key) the down button 176 in the lower section of FIG. 12. Every time the down button 176 is selected, a value corresponding to the scroll row number S is added to a value of the identification number 130 (i.e., the count of the counter j) of the content title character string displayed in the list. Therefore, the list 170 is scrolled down in the display panel 50 correspondingly to the scroll row number S, so as to display a content title character string with a larger identification number 130 (a larger count of the counter j).

When the down key selection event has received (YES in S524), the process proceeds to S526. In S526, the CPU 14 determines whether or not a value obtained by adding the scroll row number S to the count of the counter j is larger than the number m of registered contents. When the result of the addition is larger than the number m of registered contents (YES in S526), the update content information 132 corresponding to the count of the counter j of (m-1) (namely, the update content information 132 with the lowest priority) has already been displayed. In other words, the list cannot be scrolled down any more in the display panel 50. Therefore, the process proceeds to S528, where the CPU 14 informs the user of this by sounding a rejection tone. Thereafter, the process returns to S514. On the other hand, when the result of the addition is not larger than the number m of registered contents (NO in S526), the process proceeds to S530. In S530, the CPU 14 sets a value obtained by adding the scroll row number S to the count of the counter j as a new count of the counter j. Accordingly, the list 170 is scrolled down correspondingly to the scroll row number S. Thereafter, the process returns to S508.

Next, the control of the content display performed in S532 through S536 will be described. When it is determined in S524 that the down key selection event has not been received (NO in S524), the process proceeds to S532. In S532, the CPU 14 determines whether or not a content selection operation event has been received. At this point, the content selection operation event is an event for informing that a user has selected (touched) one content (one content title character string) from a plurality of contents included in the list 170 when the list 170 is displayed as illustrated in the lower section of FIG. 12. When it is determined in S532 that the content selection operation event has occurred (YES in S532), the process proceeds to S534, where the content display process is executed. In the content display process, the CPU 14 transmits the content URL 146 of the content selected by the user to the PC 70 or 71. The PC 70 or 71 downloads the content from the content distribution server on the basis of the content URL 146. Thus, the details of the selected content can be displayed in the PC 70 or 71 having a display part larger than the display panel 50.

It is noted that the content is not always displayed in the PC 70 or 71 in the content display process. The CPU 14 may transmit the display data of the content selected in the content selection operation event to the display panel 50. Thus, the details of the selected content can be displayed on the display panel 50.

On the other hand, when it is determined in S532 that the content selection operation event has not occurred (NO in S532), the process proceeds to S536, where the CPU 14 determines whether or not a list display terminating operation event has occurred. The list display terminating operation event is an event for informing that a user has selected (touched) a button 174 when the list 170 is displayed as illustrated in the lower section of FIG. 12. When the list display terminating operation event has occurred (YES in S536), the CPU 14 terminates the list display process. On the other hand, when the list display terminating operation event has not occurred (NO in S536), the process returns to S514, where the CPU 14 waits for occurrence of an event.

As described so far, in the list display process of this embodiment, the title of an article displayed in the form of the one-line scroll display on the display panel 50 when a user touches the content title character string 162 is displayed as a part of the list 170. Therefore, it is possible to avoid time and effort to find the title of the desired article (namely, the title displayed in the form of the one-line scroll display selected by the user) by, for example, scrolling the list of titles. Accordingly, the user can easily make an access to a desired content.
(RSS Menu Display Process)

Figure 10:
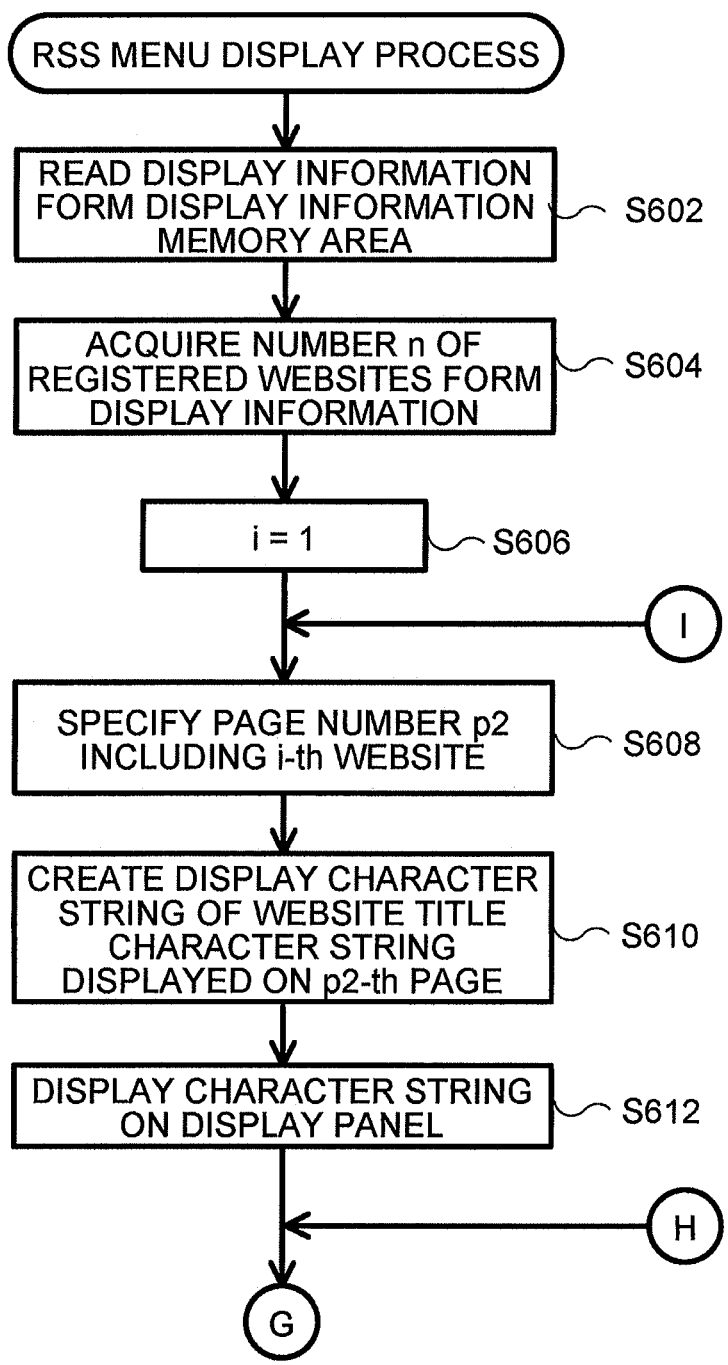
FIG. 10 is a flowchart (of a first part) of an RSS menu display process executed by the multifunctional machine.

Next, the RSS menu display process executed in S112 will be described with reference to the flowcharts of FIGS. 10 and 11. In S602, the CPU 14 reads the display information 112 from the display information memory area 36. In S604, the CPU 14 acquires the number n of registered websites stored in the URL memory area 44 (see FIG. 2) of the NVRAM 40. In S606, the CPU 14 initializes the counter i by setting the count to "1".

In S608, the CPU 14 specifies, in the display information memory area 36 of the RAM 30, a page number p2 where the i-th display information 112 is included. The page number p2 is specified as follows: The number of rows of a website list 171 to be displayed on the display panel 50 is defined as a display row number L2. The website list 171 includes the website title character string 122 with respect to each of the n registered websites. In an exemplary case illustrated in a middle section of FIG. 13, four website titles are displayed. Therefore, the display row number L2 is 4.

Figure 13:
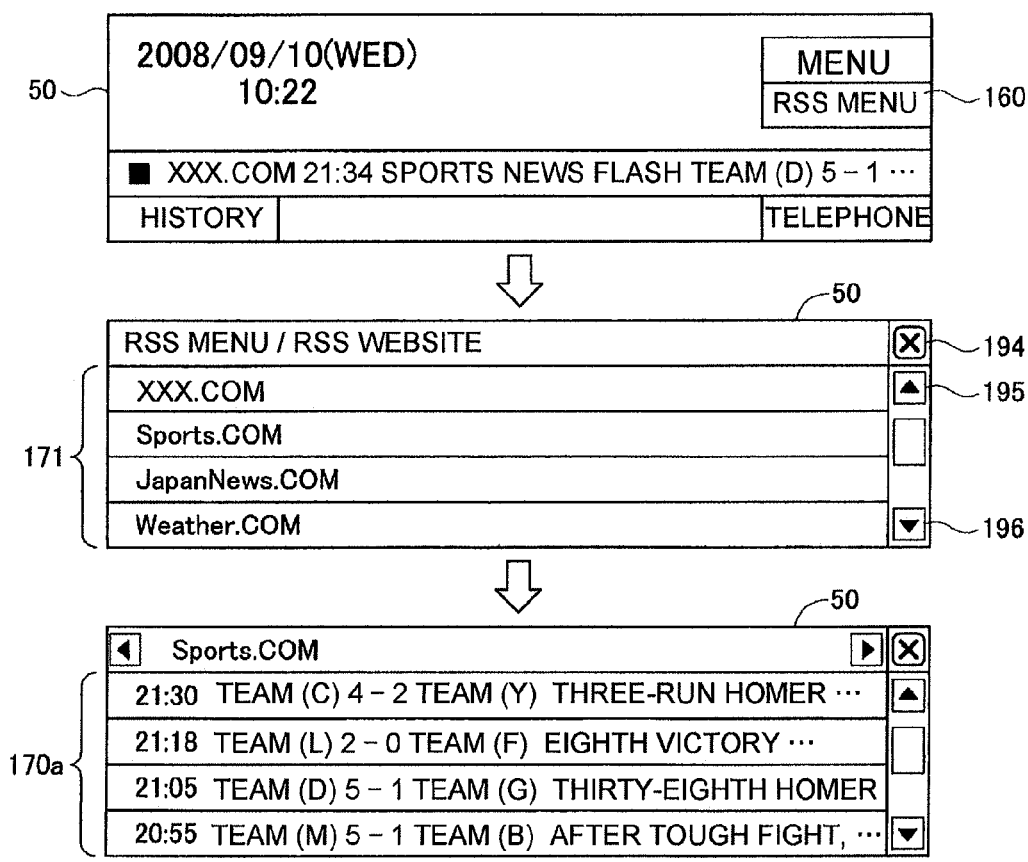
FIG. 13 is a diagram illustrating another example of the details displayed on the display panel.

Furthermore, in the exemplary case illustrated in the middle section of FIG. 13, the number of rows of the website list 171 scrolled up or down by selecting an up button 195 or a down button 196 once is defined as a scroll row number S2.

Moreover, the display information memory area 36 stores n display informations 112 to which identification numbers 110 of 0 through (n-1) are respectively allocated as illustrated in FIG. 4.

The page number p2 where the i-th display information 112 is included is obtained as a quotient in accordance with p2=((i+L2−1)/L2).

For example, when a user selects by touching the RSS menu button 160 (namely, when the RSS menu display request event occurs) as illustrated in an upper section of FIG. 13, since the identification number i is set to 1 in S606, p2=(1+4−1)/4=1 (with a remainder of 0). Therefore, the page number p2 is 1.

In S610, the CPU 14 creates list data (a display character string) based on the website title character string 122 displayed on the p2th page.

In S612, the CPU 14 transmits the list data created in S610 to the display panel 50. As a result, four rows of website title character strings 122 (such as XXX.COM) of each content distribution server are displayed as a list as illustrated in the middle section of FIG. 13.

Figure 11:
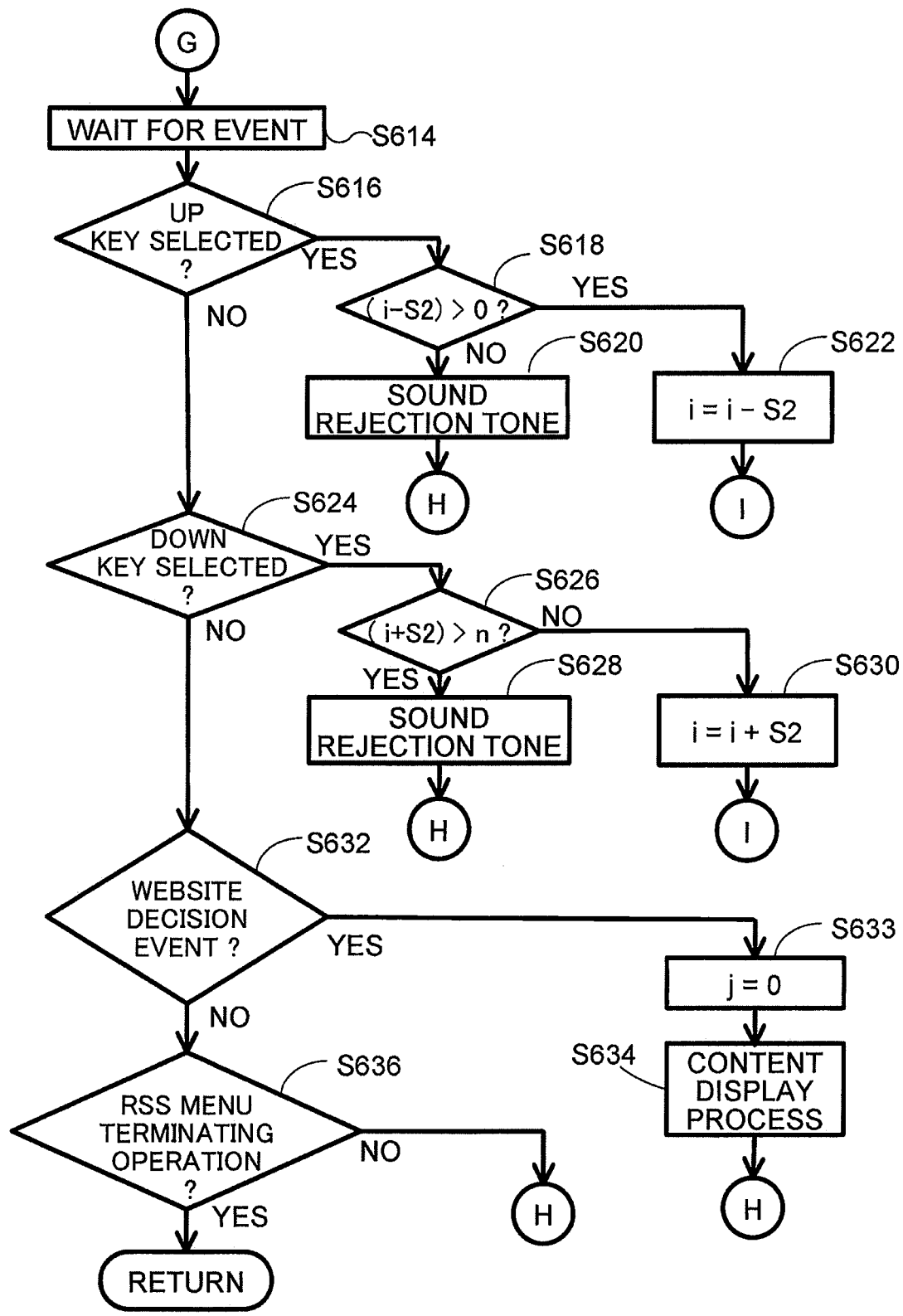
FIG. 11 is a flowchart (of a second part) of the RSS menu display process executed by the multifunctional machine.

In S614 of FIG. 11, the CPU 14 waits for occurrence of an event. Procedures of S616 through S630 of FIG. 11 are related to control of up or down scroll display of the website list 171. On the other hand, procedures of S632 through S636 are related to control of content display.

First, the control of the scroll display of the website list 171 performed in S616 through S630 will be described. In S616, the CPU 14 determines whether or not an up key selection event has been received. The up key selection event is an event for informing that a user has selected (or input with a key) the up button 195 when the website list 171 is displayed as illustrated in the middle section of FIG. 13. Every time the up button 195 is selected, the website list 171 is scrolled up in the display panel 50 correspondingly to the scroll row number S2, so that a website title character string 122 with a smaller identification number 110 (a smaller count of the counter i) can be displayed.

When the up key selection event has been received (YES in S616), the process proceeds to S618. In S618, the CPU 14 determines whether or not a value obtained by subtracting the scroll row number S2 from the count of the counter i is larger than 0. When the result of the subtraction is not larger than 0 (NO in S618), the website list 171 cannot be scrolled up any more in the display panel 50. Therefore, the process proceeds to S620, where the CPU 14 informs the user of this by sounding a rejection tone. Thereafter, the process returns to S614. On the other hand, when the result of the subtraction is larger than 0 (YES in S618), the process proceeds to S622. In S622, the CPU 14 sets a value obtained by subtracting the scroll row number S2 from the count of the counter i as a new count of the counter i. Accordingly, the website list 171 is scrolled up correspondingly to the scroll row number S2. Thereafter, the process returns to S608.

Alternatively, when it is determined in S616 that the up key selection event has not been received (NO in S616), the process proceeds to S624. In S624, the CPU 14 determines whether or not a down key selection event has received. The down key selection event is an event for informing that a user has selected (or input with a key) the down button 196 in the middle section of FIG. 13. Every time the down button 196 is selected, the website list 171 is scrolled down in the display panel 50 correspondingly to the scroll row number S2, so as to display a website title character string 122 with a larger identification number 110 (a larger count of the counter i).

When the down key selection event has received (YES in S624), the process proceeds to S626. In S626, the CPU 14 determines whether or not a value obtained by adding the scroll row number S2 to the count of the counter i is larger than the number n of registered websites. When the result of the addition is larger than the number n of registered websites (YES in S626), the website list cannot be scrolled down any more in the display panel 50. Therefore, the process proceeds to S628, where the CPU 14 informs the user of this by sounding a rejection tone. Thereafter, the process returns to S614. On the other hand, when the result of the addition is not larger than the number n of registered websites (NO in S626), the process proceeds to S630. In S630, the CPU 14 sets a value obtained by adding the scroll row number S2 to the count of the counter i as a new count of the counter i. Accordingly, the website list 171 is scrolled down correspondingly to the scroll row number S2. Thereafter, the process returns to S608.

Next, the control of the content display performed in S632 through S636 will be described. When it is determined in S624 that the down key selection event has not been received (NO in S624), the process proceeds to S632. In S632, the CPU 14 determines whether or not a website decision event has been received. At this point, the website decision event is an event for informing that a user has selected (touched) one website title character string 122 out of a plurality of website title character strings 122 of the website list 171 when the website list 171 is displayed as illustrated in the middle section of FIG. 13.

When it is determined in S632 that the website decision event has occurred (YES in S632), the process proceeds to S633. In S633, the CPU 14 determines the display order for displaying, as a list, content title character strings of the update content information 132 acquired from the selected content distribution server 90. Specifically, the count of the counter j is set to "0", and thus, the display order is determined so as to display the update content information 132 in the descending order of the priority in the list 170.

In S634, the CPU 14 performs the list display process. It is noted that the list display process performed in S634 is equivalent to the list display process performed in S502 through S536 of FIGS. 8 and 9, and hence the detailed description is omitted.

For example, it is assumed that the second website title character string 122 from the top, that is, "Sports.COM", is selected from the website list 171 illustrated in the middle section of FIG. 13 in S632. In this case, as illustrated in a lower section of FIG. 13, four rows of titles of update content information 132 acquired from the content distribution server corresponding to the selected website title character string 122 (namely, the server having the website name of Sports-.COM) are displayed as a list 170a. The list 170a is displayed with the display order that a content title characteristic string of update content information 132 with a higher priority is displayed in an upper row. For example, when the priority is set to be higher as update content information 132 includes later content update time information 142, a later information is listed in an upper row of the list 170a as illustrated in the lower section of FIG. 13. In the uppermost row of the list 170a, the content title character string of the update content information 132 with the highest priority (namely, the update content information 132 corresponding to the count of counter j of 0) is displayed. Furthermore, in an upper portion of the display panel 50, the website title character string 122 of the selected content distribution server is displayed as "Sports.COM".

On the other hand, when it is determined in S632 that the content selection operation event has not occurred (NO in S632), the process proceeds to S636, where the CPU 14 determines whether or not an RSS menu terminating operation event has occurred. The RSS menu terminating operation event is an event for informing that a user has selected (touched) a button 194 when the website list 171 is displayed as illustrated in the middle section of FIG. 13. When the RSS menu terminating operation event has occurred (YES in S636), the CPU 14 terminates the RSS menu display process. On the other hand, when the RSS menu terminating operation event has not occurred (NO in S636), the process returns to S614, where the CPU 14 waits for occurrence of an event.

As described so far, according to the invention of this embodiment, a desired content can be browsed not only through the list display process but also through the RSS menu display process. In other words, a user can be provided with a plurality of means for browsing a desired content. Therefore, when a content distribution server corresponding to a source of update content information 132 of a content highly frequently browsed by a user is specified, the content can be browsed by making an access to the content distribution server through the RSS menu display process. In this case, there is no need to wait for the one-line scroll display of titles of the update content information 132 related to the desired content distribution server 90. Therefore, the accessibility to a content desired by a user can be further improved.

Furthermore, in the RSS menu display process, the titles of update content information 132 related to the desired content distribution server 90 are displayed as a list in the order of the priority. Therefore, the title of content summary information with a higher priority is always displayed first on the display panel 50. Accordingly, it is possible to reduce time and effort to find the title of a desired article by scrolling the list of titles, and the convenience for a user is further improved.

Although the specific embodiment of the invention has been described in detail so far, the embodiment is illustrative and not restrictive, and the scope of the invention is not defined by the description. All changes and modifications of the embodiment are intended to be within the scope of the present invention defined by the appended claims. Specific modifications of the embodiment are as follows:

The multifunctional machine 10 may be equipped with means for accepting an operation for selecting a content distribution server independently of the operation for selecting a content title character string 162 scroll displayed. Specifically, the website list 171 may be displayed as illustrated in the middle section of FIG. 13 by, for example, selecting a right button 177 or a left button 178 once as illustrated in the lower section of FIG. 12. Then, when a user selects one website title from the website list 171, the titles of the update content information 132 acquired from the content distribution server corresponding to the selected website title (the server having the website name of Sports.COM) may be displayed as the list 170a as illustrated in the lower section of FIG. 13. Also, at this point, the content title character string of update content information 132 with a higher priority may be displayed in an upper row in the list 170a. Thus, a user can browse a desired content not only by the method for selecting a content title character string 162 scroll displayed but also by the method for selecting the right button 177 or the left button 178. Therefore, the accessibility to a content desired by a user can be further improved.

Furthermore, the CPU 14 executes the list display process when the list display request event has occurred in S108 of FIG. 7 so as to display the list 170 on the display panel 50 in the embodiment, which does not limit the invention. It goes without saying that the CPU 14 may execute the content display process (of S532) in S108. In this case, when a user selects (or inputs with a key) a content title character string 162 when the content title character string 162 is displayed in the telop-like manner, the selected content is displayed on the display panel 50 or on the display screen of the PC 70 or 71.

Moreover, each of the technical elements explained in the description and the drawings exhibits the technical usefulness by itself or in any of various combinations and the invention is not limited to a combination defined in the claims appended in filing. Furthermore, the technique exemplarily described in the description and the drawings achieves a plurality of objects simultaneously and exhibits the technical usefulness solely by achieving one of the objects.

Incidentally, the update content information 132 is an example of content summary information, the PC 70 or 71 is an example of an information display apparatus, the multifunctional machine 10 is an example of a communication apparatus, and the display panel 50 is an example of a display part.

While the invention has been described in connection with embodiments, it will be understood by those skilled in the art that other variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:
1. A communication apparatus comprising:
a data receiving unit configured to receive content summary information from an external server;
a display configured to display information;
a selection receiving unit configured to receive a selection input; and
a controller configured to:
acquire the content summary information via the data receiving unit;
control the display to display a plurality of titles, which are included in the acquired content summary information, in a predetermined order by scrolling the plurality of titles in a single line across the display;
accept a first selection received via the selection receiving unit and determine a first selected title which is displayed and is scrolling across the display when the first selection is input;
control the display to display a list of a plurality of titles of content summary information acquired from the external server which is a source of the content summary information of the determined first selected title;
accept a second selection received via the selection receiving unit and determine a second selected title among the plurality of titles displayed in the list;
acquire a content corresponding to the second selected title via the data receiving unit;
accept a third selection received via the selection receiving unit, such that the third selection is accepted while the plurality of titles are displayed in the predetermined order scrolling in the single line;

control, in response to the third selection, the display to display a list of a plurality of website names corresponding to the plurality of titles displayed in the predetermined order scrolling in the single line;
accept a fourth selection received via the selection receiving unit, to select one of the plurality of website names as a selected website name;
determine an external server corresponding to the selected website name among the plurality of website names; and
display the list of the plurality of titles based on the content summary information acquired from the determined external server.

2. The communication apparatus according to claim 1, wherein the controller is configured to display the list of the plurality of titles such that the list includes the first selected title.

3. The communication apparatus according to claim 1, further comprising a memory which stores priority data of the plurality of content summary information,
wherein the controller is configured to control the display to display the list of the plurality of titles of content summary information based on the priority data stored in the memory.

4. The communication apparatus according to claim 1, wherein:
the data receiving unit is configured to receive a plurality of content summary information from a plurality of external servers; and
the controller is further configured to:
control the display to display a plurality of titles which are included in the plurality of content summary information in the predetermined order scrolling in the single line;
accept a fifth selection received via the selection receiving unit and determine a third selected title which is displayed when the fifth selection is input;
determine a selected external server corresponding to the third selected title which is displayed when the fifth selection is input; and
control the display to display a list of a plurality of website names including a website name corresponding to the determined selected external server.

5. A control method for a communication apparatus comprising a data receiving unit, a display and a selection receiving unit, the method comprising steps of:
(a) acquiring content summary information via the data receiving unit;
(b) controlling the display to display a plurality of titles, which are included in the acquired content summary information, in a predetermined order by scrolling the plurality of titles in a single line across the display;
(c) accepting a first selection received via the selection receiving unit;
(d) determining a first selected title which is displayed and is scrolling across the display when the first selection is input;
(e) controlling the display to display a list of a plurality of titles of content summary information acquired from the external server which is a source of the content summary information of the determined first selected title;
(f) accepting a second selection received via the selection receiving unit;
(g) determining a second selected title among the plurality of titles displayed in the list when the second selection is input;
(h) acquiring a content corresponding to the second selected title via the data receiving unit;
(i) accepting a third selection received via the selection receiving unit, such that the third selection is accepted while the plurality of titles are displayed in the predetermined order scrolling in the single line;
(j) controlling, in response to the third selection, the display to display a list of a plurality of website names corresponding to the plurality of titles displayed in the predetermined order scrolling in the single line;
(k) accepting a fourth selection received via the selection receiving unit, to select one of the plurality of website names as a selected website name;
(l) determining an external server corresponding to the selected website name among the plurality of website names; and
(m) displaying the list of the plurality of titles based on the content summary information acquired from the determined external server.

6. A non-transitory, tangible computer readable medium bearing instructions for controlling a communication apparatus comprising a data receiving unit, a display and a selection receiving unit, the instructions, when executed, being arranged to cause a processor to perform steps of:
(a) acquiring content summary information via the data receiving unit;
(b) controlling the display to display a plurality of titles, which are included in the acquired content summary information, in a predetermined order by scrolling the plurality of titles in a single line across the display;
(c) accepting a first selection received via the selection receiving unit;
(d) determining a first selected title which is displayed and is scrolling across the display when the first selection is input;
(e) controlling the display to display a list of a plurality of titles of content summary information acquired from the external server which is a source of the content summary information of the determined first selected title;
(f) accepting a second selection received via the selection receiving unit;
(g) determining a second selected title among the plurality of titles displayed in the list when the second selection is input;
(h) acquiring a content corresponding to the second selected title via the data receiving unit;
(i) accepting a third selection received via the selection receiving unit, such that the third selection is accepted while the plurality of titles are displayed in the predetermined order scrolling in the single line;
(j) controlling, in response to the third selection, the display to display a list of a plurality of website names corresponding to the plurality of titles displayed in the predetermined order scrolling in the single line;
(k) accepting a fourth selection received via the selection receiving unit, to select one of the plurality of website names as a selected website name;
(l) determining an external server corresponding to the selected website name among the plurality of website names; and
(m) displaying the list of the plurality of titles based on the content summary information acquired from the determined external server.

* * * * *